United States Patent
McEwan

(10) Patent No.: US 6,456,231 B1
(45) Date of Patent: Sep. 24, 2002

(54) RADAR SENSOR HAVING A CFAR DETECTOR

(75) Inventor: Thomas E. McEwan, Carmel Highlands, CA (US)

(73) Assignee: McEwan Technologies, LLC, Monterey, CA (US)

( * ) Notice: Subject to any disclaimer, the term of this patent is extended or adjusted under 35 U.S.C. 154(b) by 0 days.

(21) Appl. No.: 09/872,531

(22) Filed: Jun. 1, 2001

(51) Int. Cl.[7] ............................................... G01S 7/292
(52) U.S. Cl. ............................ 342/93; 342/21; 342/159
(58) Field of Search ......................... 342/93, 159, 160, 342/161, 162, 168, 173, 21

(56) References Cited

U.S. PATENT DOCUMENTS

| | | | |
|---|---|---|---|
| 3,918,054 A | * 11/1975 | Collins ........................ | 342/192 |
| 4,072,944 A | * 2/1978 | Bianco et al. ................. | 342/16 |
| 4,249,177 A | 2/1981 | Chen ........................... | 343/7 A |
| 4,532,639 A | 7/1985 | Price et al. ................... | 375/96 |
| 4,755,792 A | 7/1988 | Pezzolo et al. ............... | 340/538 |
| 4,782,343 A | * 11/1988 | Marchais ...................... | 342/160 |
| 5,038,145 A | 8/1991 | DeCesare et al. ............. | 342/93 |
| 5,361,070 A | 11/1994 | McEwan ....................... | 342/21 |
| 5,539,412 A | * 7/1996 | Mendelson ................... | 342/192 |
| 5,559,518 A | * 9/1996 | DiDomizio ................... | 342/174 |
| 5,609,059 A | * 3/1997 | McEwan ....................... | 73/290 R |
| 5,644,315 A | 7/1997 | Long ............................ | 342/93 |
| 5,766,208 A | * 6/1998 | McEwan ....................... | 600/595 |
| 5,805,110 A | 9/1998 | McEwan ....................... | 342/387 |
| 5,870,055 A | * 2/1999 | Kim ............................. | 342/169 |
| 5,901,172 A | 5/1999 | Fontana et al. ............... | 375/200 |
| 5,949,368 A | 9/1999 | DeCesare ..................... | 342/93 |
| 5,966,090 A | 10/1999 | McEwan ....................... | 342/27 |
| 6,107,957 A | 8/2000 | Cramer et al. ............... | 342/124 |
| 6,191,724 B1 | 2/2001 | McEwan ....................... | 342/21 |

FOREIGN PATENT DOCUMENTS

| | | | |
|---|---|---|---|
| JP | 08184665 A | * | 7/1996 |
| JP | 10078480 A | * | 3/1998 |

OTHER PUBLICATIONS

David K. Barton et al. "*Radar Technology Encyclopedia*" Library of Congress Cataloging–in–Publication Data 1997 Artech House, Inc. pp. 91–94.

Merrill I. Skolnik "*Introduction to Radar Systems*" 1980 pp. 392–395.

* cited by examiner

Primary Examiner—John B. Sotomayor
(74) Attorney, Agent, or Firm—Mark A. Haynes; Haynes Beffel & Wolfeld LLP

(57) ABSTRACT

A constant false alarm rate (CFAR) detector prevents false radar triggers due to RF interference by proportionally increasing the radar detection threshold as interference increases. The radar operates with a randomized PRF, which randomizes detected RF interference while maintaining echo signal coherence. Post-detection filters provide a signal channel and an interference channel. The interference channel augments the threshold of the signal threshold detector. The interference channel gain can be adjusted to ensure the detection threshold is always higher than noise in the signal channel, thereby eliminating false alarms due to RF interference. Accordingly, the CFAR detector eliminates a major false alarm nuisance, particularly in radar security sensors. Applications for the low-cost system include indoor and outdoor burglar alarms, automotive security alarms, home and industrial automation, robotics, and vehicle proximity sensors.

13 Claims, 2 Drawing Sheets

RADAR SENSOR HAVING A CFAR DETECTOR

BACKGROUND OF THE INVENTION

1. Field of the Invention

The present invention relates to radar sensors, and more particularly to short-range pulse-radar sensors having a constant false alarm rate (CFAR) detector.

2. Description of Related Art

CFAR detection is a digital detection process for radar where the detection threshold is increased in the presence of noise or radar clutter. In large radars, such as air traffic control radars, clutter usually dominates rather than internally generated noise. These radars often use range cell averaging to set the digital threshold. Noise due to rain, clutter returns or interference automatically raises the detection threshold across each range cell and prevents the display from becoming obliterated. A discussion of cell-averaging CFAR detectors can be found in radar texts.

Small radar sensors such as 10.5 GHz CW Doppler radars commonly used to open doors or sense intrusion into a secure area are prone to false alarms due to RF interference from nearby radar sensors or from the increasing number of communications devices radiating in the microwave spectrum, particularly in the ISM bands at 900 MHz and 2.4 GHz. While these Doppler radars have front-end RF filters to reject out-of-band interference, there is little that has been done to prevent false alarms from in-band interference.

Ultra-wideband Micropower Impulse Radar (MIR) as exemplified in U.S. Pat. No. 5,361,070, "Ultra-Wideband Radar Motion Sensor," to McEwan, and wideband motion sensors based on pulsed RF emissions such as U.S. Pat. No. 5,966,090, "Differential Pulse Radar Motion Sensor," to McEwan rely on a high level of pulse averaging to reject in-band interference. Typically, 1000 pulses are averaged, providing 30 dB of in-band interference rejection, which may be an insufficient amount of rejection if an in-band interferer is within several meters range. Some applications require zero false alarms due to RF interference at any range.

The proliferation of cell phones and wireless LANs, and an unpredictable future in terms of RF interference leave many prospective users of radar sensors wary of false alarm nuisances. For example, a 5.8 GHz radar motion sensor may rarely trigger from RF interference today, but perhaps two years from now 5.8 GHz phones, wireless LANS, or some unknown product may proliferate and turn a great radar sensor into a major false alarm headache.

Clearly, "no false alarms" must be ensured if radar sensors are to find their way into widespread use. A radar sensor having a CFAR detector of the present invention overcomes these prior limitations.

SUMMARY OF THE INVENTION

The present invention is based on range-gated pulsed radar having randomized pulse-to-pulse emissions in the form of a randomized pulse repetition frequency (PRF). For each pulse emitted, the radar generates a range gate pulse to gate its receiver at a precise time after emission, corresponding to a precise target range. The range gate timing relative to an echo return is not affected by the randomized PRF, since neither the range gate timing nor the round trip echo time vary with PRF.

However, a random PRF randomizes the pulse-to-pulse gate time such that RF interference is gated, i.e., sampled, randomly. All RF interference is thereby converted into a sequence of random amplitude samples. This random sequence of samples has a broader spectral width that the desired radar signal, thereby allowing filters to separate signal and interference into two channels (or processors), a signal channel (or processor) and an interference channel (or processor). The interference channel is rectified and low-pass filtered (i.e., envelope detected) to provide a reference level for a CFAR threshold detector. By suitably adjusting the gain of the interference channel, increasing levels of RF interference can be made to increase the CFAR threshold faster than the increase in interference in the signal channel signal, thereby assuring no CFAR threshold crossings due to RF interference. In effect, the radar becomes increasingly blinded with RF interference but never false triggers due to RF interference. Thus, the CFAR detector only produces an output when the radar transceiver has received an echo signal from the target and not from an interference signal.

Unlike previous CFAR detectors which average noise from multiple range cells to set a CFAR threshold in each range cell (i.e., channelizing in time without randomizing the PRF), the present invention randomizes all RF interference by randomizing its PRF and accordingly its sampling rate, and then spectrally filters the sampled receive RF into a signal channel and an interference channel for CFAR detection purposes (i.e., channelizing in frequency with a randomized PRF). A primary object of the present invention is to provide a radar sensor free of false alarm nuisances due to RF interference.

Another object of the present invention is to provide a spread-spectrum microwave motion sensor that can be co-located with other spectrum users without having to set a specific operating frequency.

Uses for the present invention include indoor and outdoor security alarms, home automation and lighting control, industrial and robotic controls, automatic toilet and faucet control, tank level sensing, rangefinding, automatic door openers, vehicle backup warning and collision detection, and general appliance control.

DETAILED DESCRIPTION OF THE INVENTION

A detailed description of the present invention is provided below with reference to the Figures. While illustrative component values and circuit parameters are given, other embodiments can be constructed with other component values and circuit parameters. All US Patents and copending US applications cited herein are herein incorporated by reference.

Figure 1:
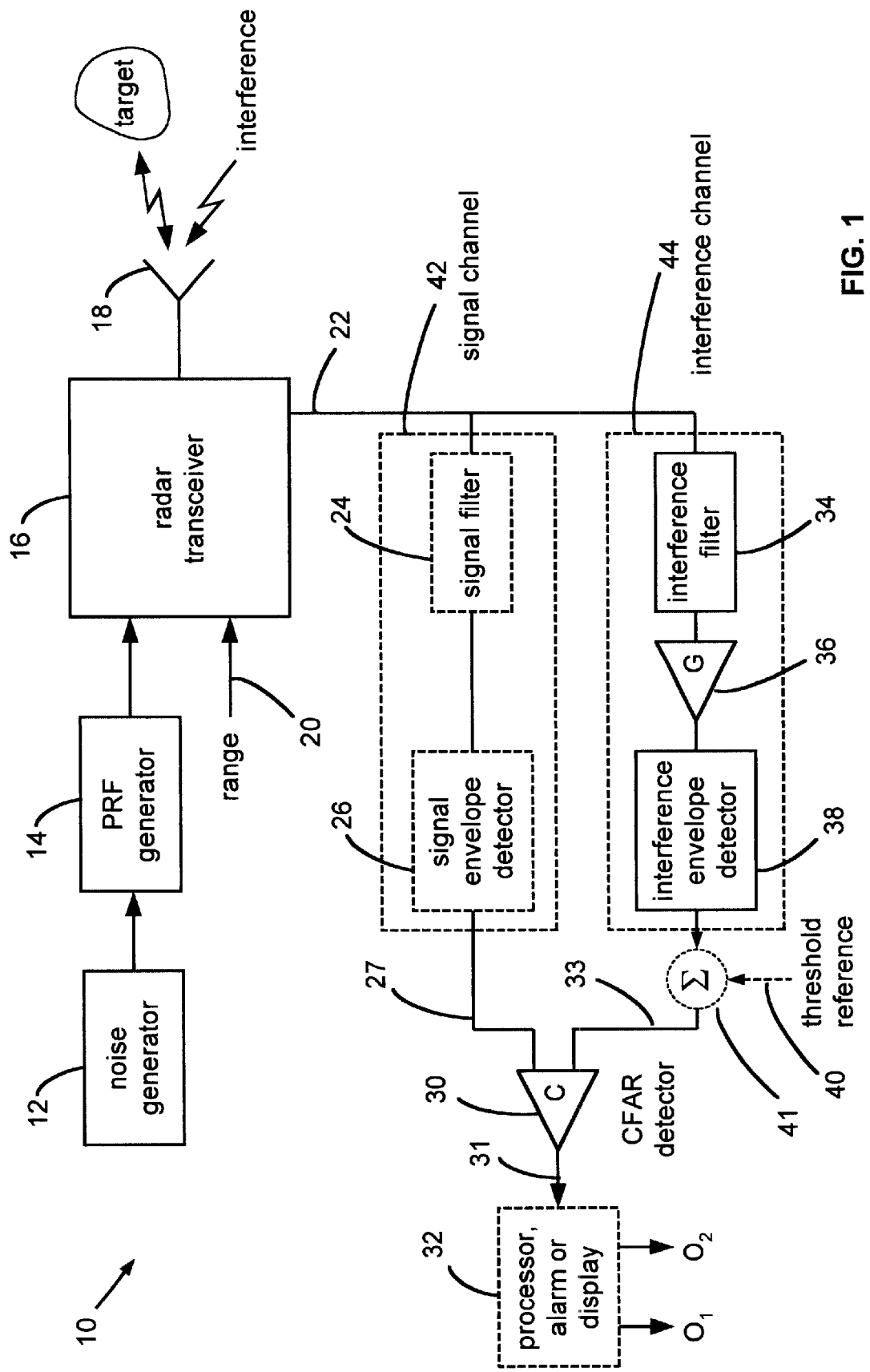
FIG. 1 is a block diagram of a radar sensor having a CFAR detector of the present invention.

FIG. 1 is a block diagram of a radar sensor (or transceiver apparatus) 10 of the present invention. A noise generator 12 randomly modulates the frequency of PRF generator 14. The PRF generator controls the timing of RF radar pulses emitted by radar transceiver 16. For each pulse provided by the PRF generator, an RF pulse is generated by radar transceiver 16 and radiated by antenna 18 to a target. PRF generator 14 typically produces squarewaves at a PRF of 2 MHz that are formed into ~10 ns wide transmit RF pulses by transceiver 16. The RF pulse oscillations generated by the radar transceiver are phase coherent with the PRF pulses, i.e., the phase of the RF sinusoids applied to antenna 18 relative to the PRF pulses remains constant from one PRF cycle to the next—there is no significant PRF-to-RF jitter. This high level of phase coherence is not common in large radar systems, which typically pulse modulate, or gate, a CW RF source with no concern for the phase between the modulating pulse and the CW RF. In the present invention, digital pulses, e.g., squarewaves, from the PRF generator typically turn-on an RF oscillator in a manner which retains a high level of phase coherence.

The PRF generator 14 can be randomly modulated in frequency, phase, or with ON-OFF gating by noise generator 12. The noise modulation may be psuedo-noise coded to distinguish the radar signal from that of others.

For each PRF cycle an RF burst is radiated by antenna 18 to a target and an echo RF burst is received back to antenna 18. Radar transceiver 16 selectively gates, or samples, the received RF bursts with controlled timing from the PRF generator in combination with a range delay input provided on line 20. The samples form a sampled baseband output on line 22 and represent radar reflections from a particular range.

If radar transceiver 16 is a motion sensor, the range input on line 20 is fixed, or may time hop between two or more fixed values, so the baseband output provides no changing signal unless the target moves. Target motion produces a range-gated Doppler signal on baseband output line 22.

If radar transceiver 16 is a rangefinder, the range input on line 20 is swept to produce a range scan, and the baseband output is an A-scan containing pulses corresponding to targets at various ranges.

Signal channel or processor 42 couples baseband output on line 22 to a first input on line 27 of CFAR detector 30. The signal channel may optionally contain a noise-reducing signal filter 24 and a signal envelope detector 26, but in its simplest form merely passes the baseband output signal on line 22 to line 27. Signal envelope detector 26 is particularly useful with rangefinder radars where the baseband representation of the A-scan pulses is comprised of a number of cycles, which can be envelope detected to form a unipolar pulse for threshold detection free of cycle-to-cycle jumps.

Interference channel or processor 44 is comprised of an interference filter 34, which rejects signal components while passing interference components from baseband output line 22. The output of interference filter 34 is amplified by amplifier 36 and envelope detected by interference envelope detector 38 so it may not appear as a separate element. Generally amplifier 36 is merged with circuitry for elements 34 or 38. Employing envelope detector 38 is a preferred mode, but in a simple system it may be ignored.

The output of interference channel 44 is applied to a second input to CFAR detector 30 on line 33. CFAR detector 30 is a threshold comparator with the first input being the signal input and the second input being the threshold input. Thus, the interference channel sets the threshold level. Optional summation element 41 may be inserted between the interference channel 44 and CFAR detector 30 to allow injection of a threshold reference level on line 40.

RF interference is randomly sampled by radar transceiver 16 and processed through interference channel 44 to produce a voltage that augments, i.e., increases the threshold voltage on line 33. If the radar signal on line 27 created by a target return is contaminated with interference, the net instantaneous voltage on line 27 increases with the interference, but not as much as the increase in reference level on line 33, depending on the gain G of amplifier 36. Thus, interference passing through the signal channel 42 may never exceed the threshold level on line 33 and CFAR detector 30 may never produce an output on line 31 due to interference. However, and actual echo signal on line 22 may still produce an output from CFAR detector 30.

An optional processor, alarm, or display 32 may be responsive to the CFAR detector output on line 31 in a manner well known in the art, such as a Doppler cycle counter when the radar transceiver is a motion sensor, or a measurement timer when the radar transceiver is a rangefinder. Processor 32 may have one or more outputs O1, O2 for controlling systems, i.e., vehicles, doors, etc. in response to the radar sensor.

The embodiment of radar transceiver 16 may follow U.S. Pat. No. 5,361,070, "Ultra-Wideband Radar Motion Sensor," to McEwan, or wideband motion sensors based on pulsed RF emissions such as U.S. Pat. No. 5,966,090, "Differential Pulse Radar Motion Sensor," to McEwan for motion sensors where the range input on line 20 is adjustable but fixed. When the range input on line 20 to radar transceiver 16 is swept in time, the radar transceiver becomes a rangefinder transceiver, as exemplified in U.S. Pat. No. 5,805,110, "Impulse Radar with Swept Range Gate," to McEwan and U.S. Pat. No. 6,191,724, "Short Pulse Microwave Transceiver," to McEwan. Additional CFAR detectors of FIG. 1 may be substituted by a practitioner for the start and stop comparators used in the range measurement circuitry of the referenced rangefinder patents.

Figure 2:
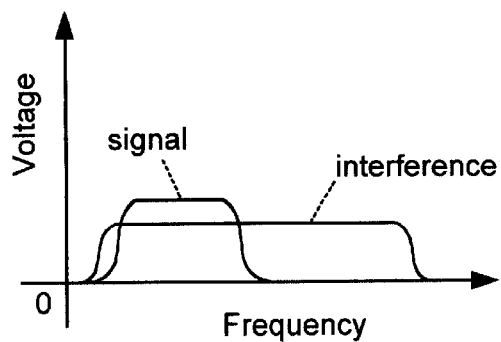
FIG. 2 depicts baseband signal and interference spectra of the present invention.

FIGS. 2 plots the signal spectrum and the interference spectrum at the radar transceiver output on line 22. When the radar transceiver is a motion sensor, the signal spectrum is the Doppler frequency range, as set by target velocity. For a 5.8 GHz motion sensor the signal spectrum may span 1–100 Hz. The interference spectrum is much broader, as high as ½ the PRF. More typically it may be ½ the PRF divided by the number of receive pulses integrated within radar transceiver 16, or typically several kilohertz to several tens of kilohertz. The interference spectrum is relatively large since each sample taken at the PRF can have a random amplitude in the presence of interference since the time of sampling (or range-gating) is random. Thus, the sampled interference output is a train of random samples, or integrated samples, occurring at the PRF, or the PRF divided by the number of samples integrated (when integrated). Obviously, since the PRF is randomized, all interference is randomly sampled to produce a random train of samples regardless of whether the interference is a clean CW sinusoidal waveform or a complex, modulated signal.

Figure 3:
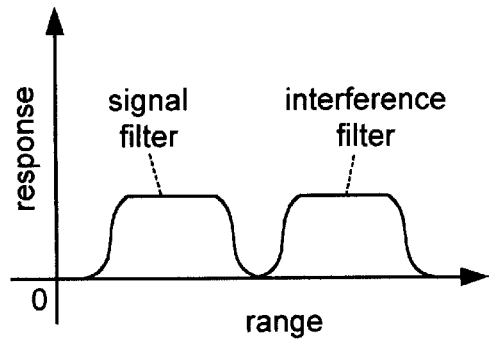
FIG. 3 plots signal and interference filter responses of the present invention.

FIG. 3 plots the passbands for the signal and interference filters. Ideally, the signal filter passband exactly matches the signal spectrum. The interference filter passband is chosen to lie outside the signal spectrum to reject signal components, and generally lies above the signal spectrum, although it could also lie below the signal spectrum.

If the PRF were not randomized, beat frequencies can form between CW interference and RF spectral lines generated by radar transceiver 16. The beat frequencies can fall within the signal filter passband of FIG. 3 and not within interference filter passband and thus appear as a bona fide signal. By randomizing the PRF with noise generator 12, the RF spectral lines disappear and no interference beats can be formed—only wideband noise at baseband output 22, thereby allowing the easy filter-separation of interference from the signal for CFAR detection.

An additional benefit of randomizing the PRF is to allow collocation of radar sensors with reduced mutual interference. PRF randomization decorrelates the PRF of each radar with respect to the others and prevents PRF "walk-throughs", i.e., beats, which would create strong signal-like interference at the baseband outputs of the radar sensors. This form of spread spectrum operation is known in the art and is elaborated upon in the cited references.

Figure 4:
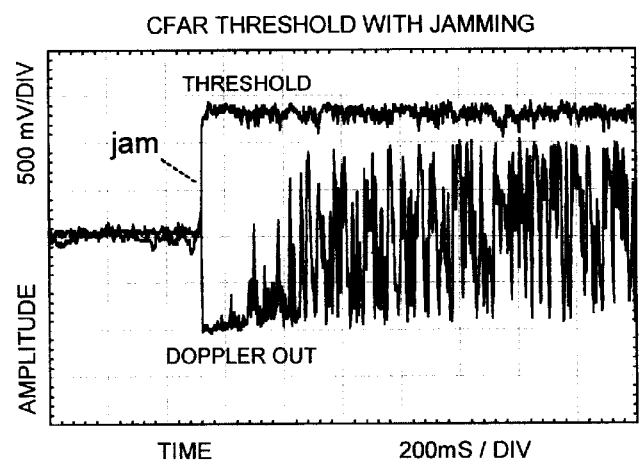
FIG. 4 plots signal channel and interference channel (i.e., threshold) data for a CFAR detector prototype of the present invention.

FIG. 4 is a plot of prototype data taken with no signal present to illustrate the effect of interference on the threshold voltage on line 33 and the noise level from the signal channel on line 27. Interference is switched-on at the "jam" point in the plot. The CFAR threshold on line 33 is seen to immediately increase to a level that is above the strongest noise peaks in signal channel output on line 27. Thus, CFAR detector 30 does not threshold-detect the interference-induced noise and produce a false alarm on line 31. Naturally, smaller levels of interference result in a smaller increase in threshold level. At almost any level of interference, a bona fide signal may exceed the threshold of CFAR detector 30 and produce a valid detection on line 31. The effect of increasing the threshold due to interference is to reduce the sensitivity of the radar as interference increases. Thus, radar sensor 10 becomes gracefully blinded with increasing RF interference, and cannot be false triggered by any level of RF interference.

The jammer parameters of FIG. 4 are: jammer power=+1 dBm at 5711 MHz from a 8 dBi horn at a range of only 5 cm from transceiver antenna 18. This is equivalent to a 100 mW jamming source at 0.5 meters or a 1-watt jamming source at 1.5-meters. The bandwidth of signal filter 24 is 1–35 Hz and the bandwidth of the interference filter 34 is 200–2000 Hz. The specific radar transceiver architecture is described in U.S. Pat. No. 5,966,090, "Differential Pulse Radar Motion Sensor," to McEwan. The CFAR circuit raises the detection threshold on line 33 above the noise level from the signal channel on line 27 and prevents false detection from the CFAR detector.

Changes and modifications to the specifically described embodiments can be carried out without departing from the scope of the invention, which is intended to be limited only by the scope of the appended claims.

What is claimed is:

1. A radar transceiver apparatus comprising:
    a noise generator;
    a PRF generator modulated by the noise generator;
    a radar transceiver for transmitting and receiving RF bursts with controlled timing from the PRF generator, and for producing a baseband output;
    an antenna connected to the radar transceiver for radiating RF bursts to, and receiving echo bursts from a target;
    an interference processor coupled to the radar transceiver baseband output;
    a threshold detector having first and second inputs for detecting baseband signals, with the first input coupled to the baseband output of the radar transceiver and the second input coupled to the interference processor.

2. The apparatus of claim 1 wherein the PRF generator is frequency modulated by the noise generator.

3. The apparatus of claim 1 further comprising a signal processor coupled between the baseband output of the radar transceiver and the first input of the threshold detector.

4. The apparatus of claim 3 wherein the signal processor comprises a signal filter.

5. The apparatus of claim 4 wherein the signal processor further comprises an envelope detector connected to the signal filter.

6. The apparatus of claim 1 wherein the interference processor comprises an interference filter, an amplifier, and an envelope detector.

7. The apparatus of claim 1 further comprising a threshold reference summation element coupled between the interference processor and the second input of the threshold detector.

8. A radar sensor comprising:
    a radar transceiver for transmitting and receiving RF bursts at a random PRF, and for producing a baseband output;
    an antenna for radiating RF bursts to, and receiving echo RF bursts from a target;
    a baseband interference filter for filtering baseband interference from the baseband output;
    an amplifier for amplifying the filtered baseband interference;
    an interference envelope detector for generating a smoothed interference envelope of the amplified filtered baseband interference;
    a threshold detector responsive to the difference between the baseband output and the smoothed interference envelope.
    a threshold detector responsive to the difference between the baseband output and the
    smoothed interference envelope.

9. The sensor of claim 8 further comprising a signal filter for filtering the baseband signal.

10. The sensor of claim 9 further comprising a signal envelope detector for generating a smoothed signal envelope.

11. The sensor of claim 8 further comprising a summation element for summing a threshold reference voltage with the smoothed interference envelope for augmenting the threshold detector threshold.

12. A method of radar sensing, comprising:
    transmitting RF bursts at a PRF;
    receiving RF echo bursts at the PRF;
    sampling the received RF echo bursts with controlled timing at the PRF to provide a sampled baseband output;
    noise modulating the PRF to randomize sampled interference;
    filtering the sampled baseband output to exclude baseband signals and produce an interference signal;
    threshold detecting the baseband signal using the interference signal to augment the threshold level.

13. The method of claim 12 further comprising augmenting the threshold level with a threshold reference voltage.

* * * * *